United States Patent
Larsson et al.

(10) Patent No.: US 8,852,434 B2
(45) Date of Patent: Oct. 7, 2014

(54) FILTER ELEMENT FOR A DISC FILTER

(75) Inventors: Hans F. Larsson, Vastra Frolunda (SE); Kjell Gustafsson, Vastra Frolunda (SE)

(73) Assignee: Nordic Water Products AB, Vastra Frolunda (SE)

( * ) Notice: Subject to any disclaimer, the term of this patent is extended or adjusted under 35 U.S.C. 154(b) by 677 days.

(21) Appl. No.: 12/867,951

(22) PCT Filed: Feb. 17, 2009

(86) PCT No.: PCT/SE2009/050165
§ 371 (c)(1),
(2), (4) Date: Oct. 22, 2010

(87) PCT Pub. No.: WO2009/105015
PCT Pub. Date: Aug. 27, 2009

(65) Prior Publication Data
US 2011/0024347 A1 Feb. 3, 2011

(30) Foreign Application Priority Data
Feb. 22, 2008 (SE) ........................................ 0800419

(51) Int. Cl.
*B01D 33/00* (2006.01)
*B01D 33/06* (2006.01)
*B01D 24/00* (2006.01)
*B01D 33/23* (2006.01)

(52) U.S. Cl.
CPC .................................... *B01D 33/23* (2013.01)
USPC ........... 210/331; 210/329; 210/326; 210/324; 210/402; 210/358; 210/357

(58) Field of Classification Search
None
See application file for complete search history.

(56) References Cited

U.S. PATENT DOCUMENTS 5,766,466 A * 6/1998 Peterson ..................... 210/323.1
6,231,761 B1 * 5/2001 Mohlin et al. ................ 210/232
2006/0260999 A1 * 11/2006 Danielsson et al. .......... 210/402

FOREIGN PATENT DOCUMENTS

| CA | 2 070 341 A1 | 12/1992 |
|---|---|---|
| WO | 94/19088 A1 | 9/1994 |
| WO | 2004/076026 A1 | 9/2004 |

OTHER PUBLICATIONS

International Search Report, dated Jun. 12, 2009, from corresponding PCT application.

* cited by examiner

*Primary Examiner* — Nam Nguyen
*Assistant Examiner* — Richard Gurtowski
(74) *Attorney, Agent, or Firm* — Perkins Coie LLP

(57) ABSTRACT

A filter element (2) for use in a disc filter (1), wherein a plurality of filter elements (2) are arranged on a rotor shaft (3) in a manner allowing liquid communication between the inside (4) of the filter elements (2) and the inside (5) of the rotor shaft (3), for the filtering of liquids. The filter element (2) includes a framework (6) carrying a filter cloth (7) on both its side surfaces (8), wherein the framework (6) and the filter cloth (7) are permanently joined forming a single use filter element (2) and the filter element has at least one passage (21) in each edge (22) for liquid communication between the inside (4) of adjacent filter elements. A disc filter (1) including a single use filter element (2) is also provided.

9 Claims, 4 Drawing Sheets

Figure 1:
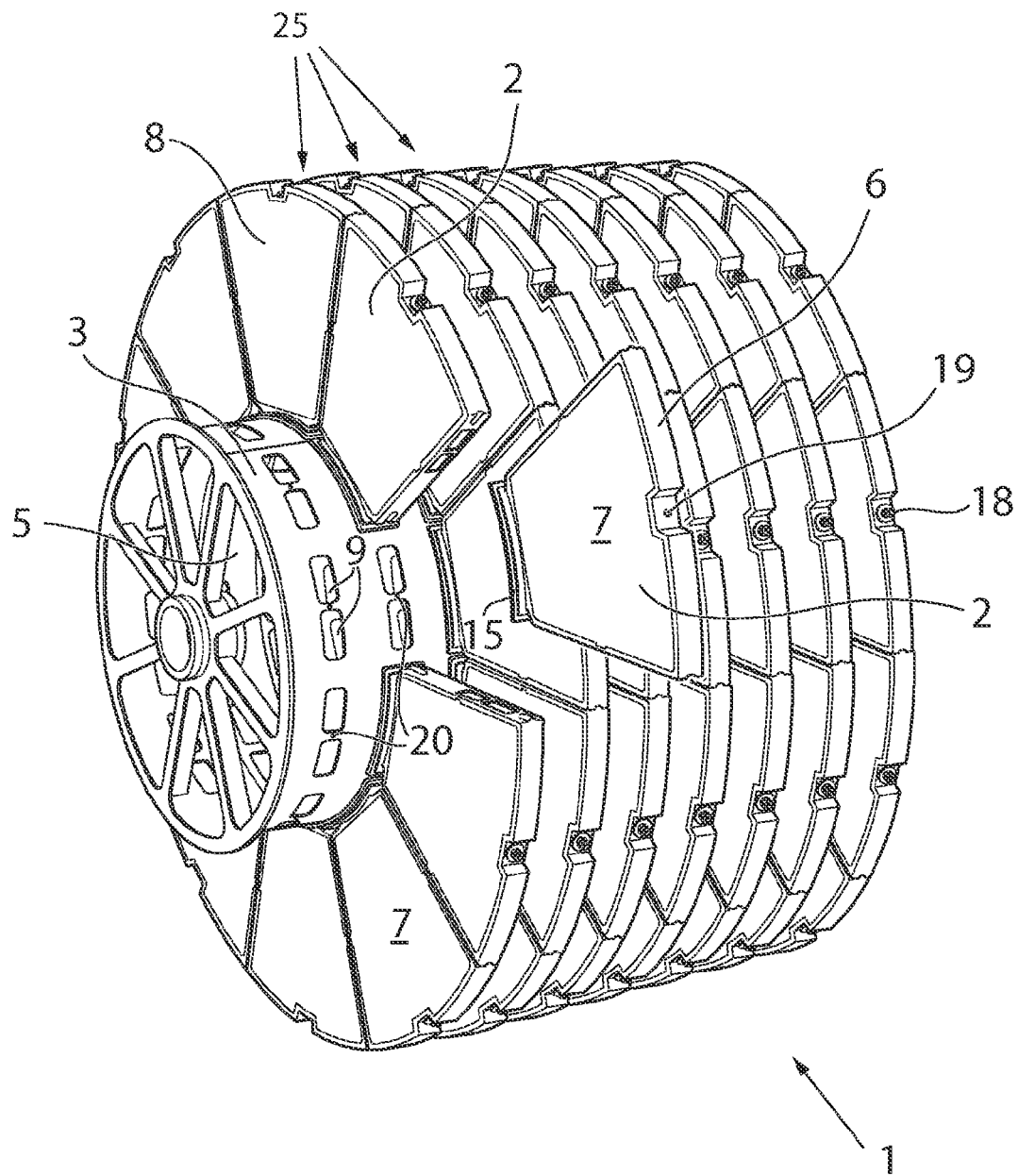

FILTER ELEMENT FOR A DISC FILTER

TECHNICAL FIELD

The present invention relates to a filter element for use in a disc filter for filtering liquid containing particles, wherein a plurality of filter elements is arranged on a rotor shaft in a manner allowing liquid communication between the inside of the filter elements and the inside of the rotor shaft, for filtering liquids. The filter element comprises a framework or structure carrying filter cloth on both side surfaces.

BACKGROUND

When filtering is to take place from the inside out, the rotor shaft has a hollow core and liquid to be filtered is fed to the inside of the rotor shaft. The filter element and the rotor shaft have suitable openings through which the liquid to be filtered is fed to the inside of the filter element. The filtering takes place from the inside of the filter element and out though the filter cloth. Particles in the liquid are separated on the inside of the filter cloth.

A plurality of filter elements is attached to the rotor shaft around the periphery thereof, together forming filter discs. The rotor shaft is usually capable of carrying a plurality of such discs.

During operation, the rotor shaft carrying the filter discs is rotated and the filter discs are partially immersed in filtered liquid during rotation. The liquid level inside the filter discs is higher than the liquid level outside the filter discs. Particles separated on the inside of the filter cloth are rinsed away with the help of spray nozzles placed so that the jets of liquid from the nozzles hit the outside of the filter cloth when the filter cloth is in the air. The particles are rinsed away and flow through the filter element and into the rotor shaft, where they are caught in a reject trough.

The filter element according to the present invention can also be used in disc filters for filtering from the outside of the filter discs and into the rotor shaft, wherein particles are deposited on the outside of the filter cloth and the filtered liquid flows into the rotor shaft. A reject trough can be arranged on the outside of the filter discs to catch reject that has been rinsed away, so that this can be rinsed down and "creamed off".

Usually known filter elements consist of a framework or structure over which a bag of filter cloth is treaded and crimped, or a framework and replaceable panels of filter cloth. The basic thought is that the framework is reused.

SUMMARY OF THE INVENTION

An object of the invention is to provide a filter element which is simple and cost-efficient to manufacture, has light weight, and is easy to replace.

The present invention fulfils this object by a filter element as initially described, where the framework and the filter cloth are permanently joined forming a single use filter element, wherein the filter element has at least one passage in each edge for liquid communication between the inside of adjacent filter elements when the filter elements are assembled edge to edge forming a filter disc.

A filter element according to the invention consists of a single component, whereas a conventional filter element for disc filters consists of at least two parts when the bag type is concerned, and at least four components in the type having replaceable filter cloth panels, i.e. a frame, two replaceable filter cloth panels and a lid which locks the filter cloth panels in place.

The passages on the edges cause liquid and gas to flow between the filter elements during rotation of the filter discs. This facilitates filling and emptying the filter elements, facilitates filtering, and results in increased capacity.

The filter element according to the invention is preferably manufactured entirely in one or more polymeric materials, allowing rational manufacture. The filter element is much lighter than the conventional filter element, making it possible to build the rotor shaft with reduced wall thickness compared to the conventional case and to operate the filter at less expense.

Another advantage is that the filter element is easier to replace due to its low weight. Also, it does not require as complicated fastening as conventional filter elements and is thus much easier to replace, for example if the filter media is damaged. As the filter element according to the invention can be manufactured entirely of polymeric materials, it can be easily disposed of, e.g., by incineration.

A filter element according to one embodiment of the invention is attachable to the rotor shaft through a single fastening organ. It is kept in place by an attachment organ comprising a long bolt and nut, which works well as the filter element has low weight.

In the above embodiment of the filter element, a seal can be arranged between the filter element and the rotor shaft, and a seal can be arranged around the passage to the adjacent filter element on one edge only. Using only two seals compared to four, as conventionally used, minimizes the risk for leakage of unfiltered liquid into filtered liquid.

One embodiment of the filter element preferably has a width between the side surfaces of filter cloth between 1.15 to 1.40 times the width of a passage for liquid communication in the rotor shaft. As the filter elements have a narrow construction, a more compact disc filter is made possible, meaning that more filter discs can be arranged on the same rotor shaft compared to disc filters assembled from conventional filter elements. This results in a significantly higher capacity of the disc filter.

According to the present invention, a disc filter assembled from filter elements according to the invention is also provided.

SHORT DESCRIPTION OF THE DRAWINGS

Figure 2:
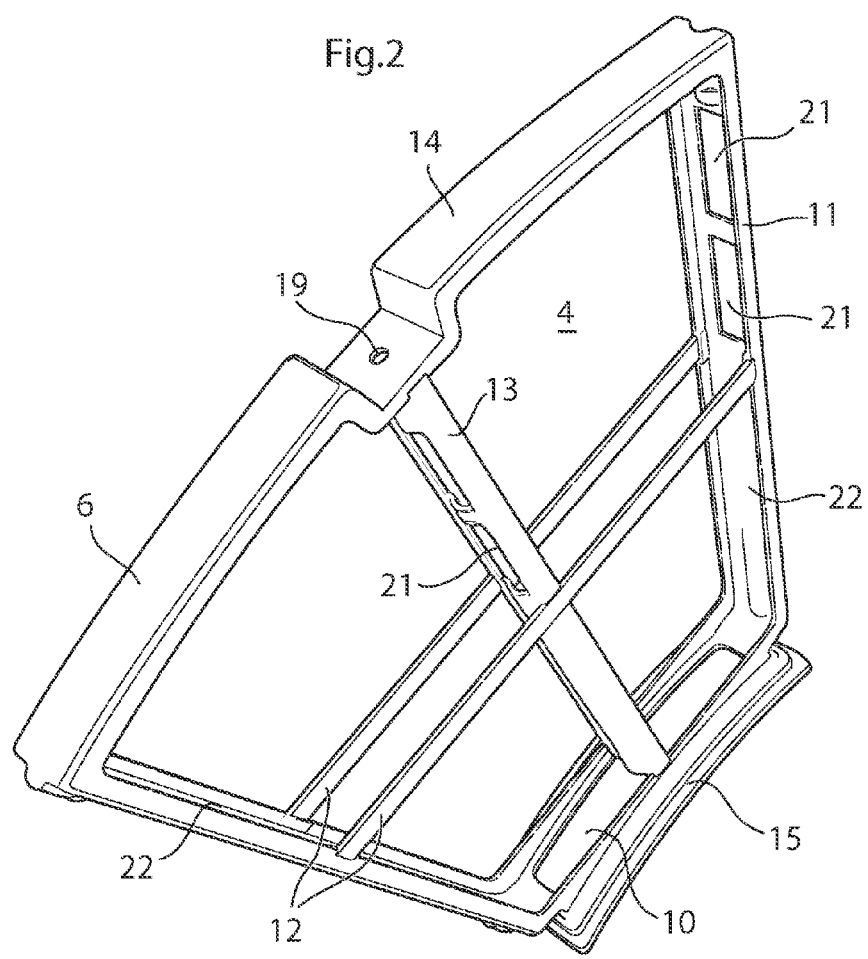
Figure 3:
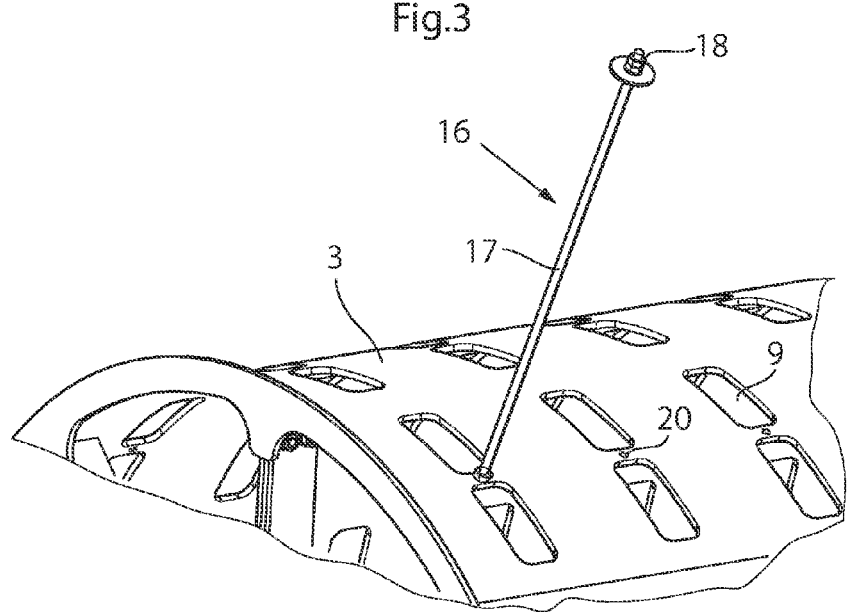
Figure 4:
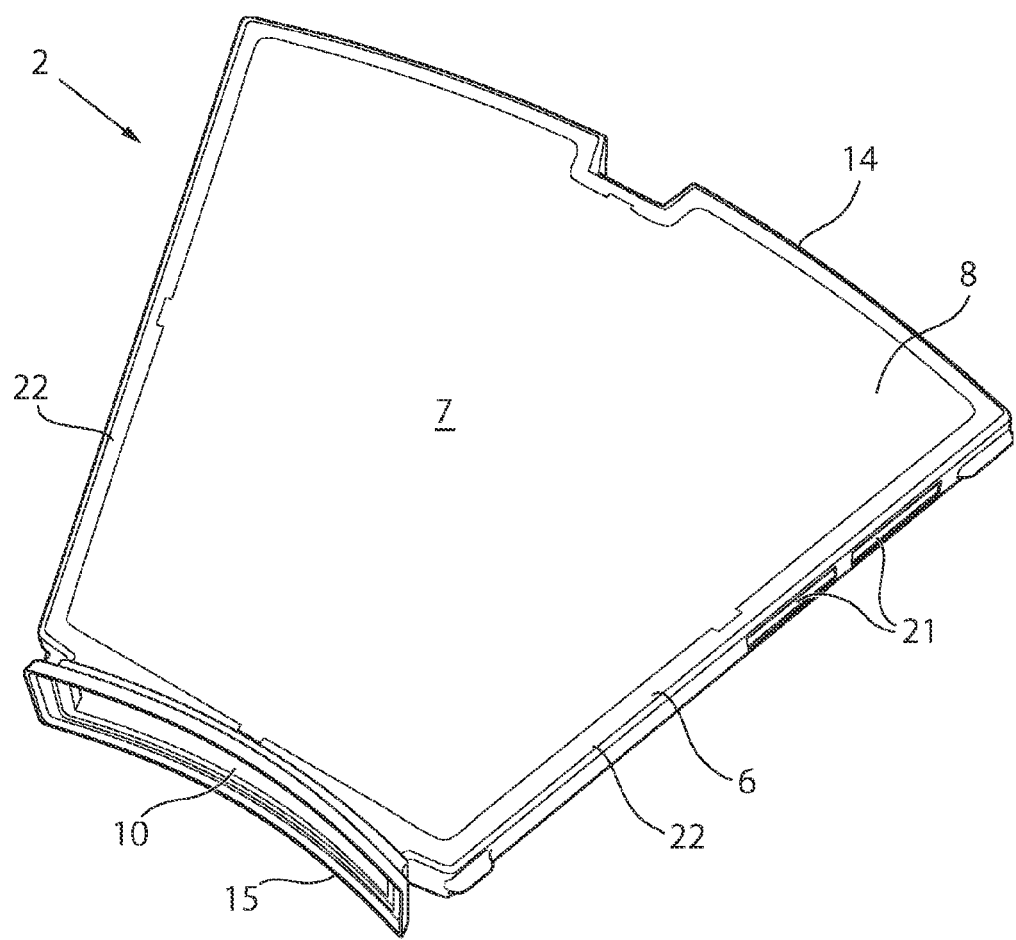
Figure 5:
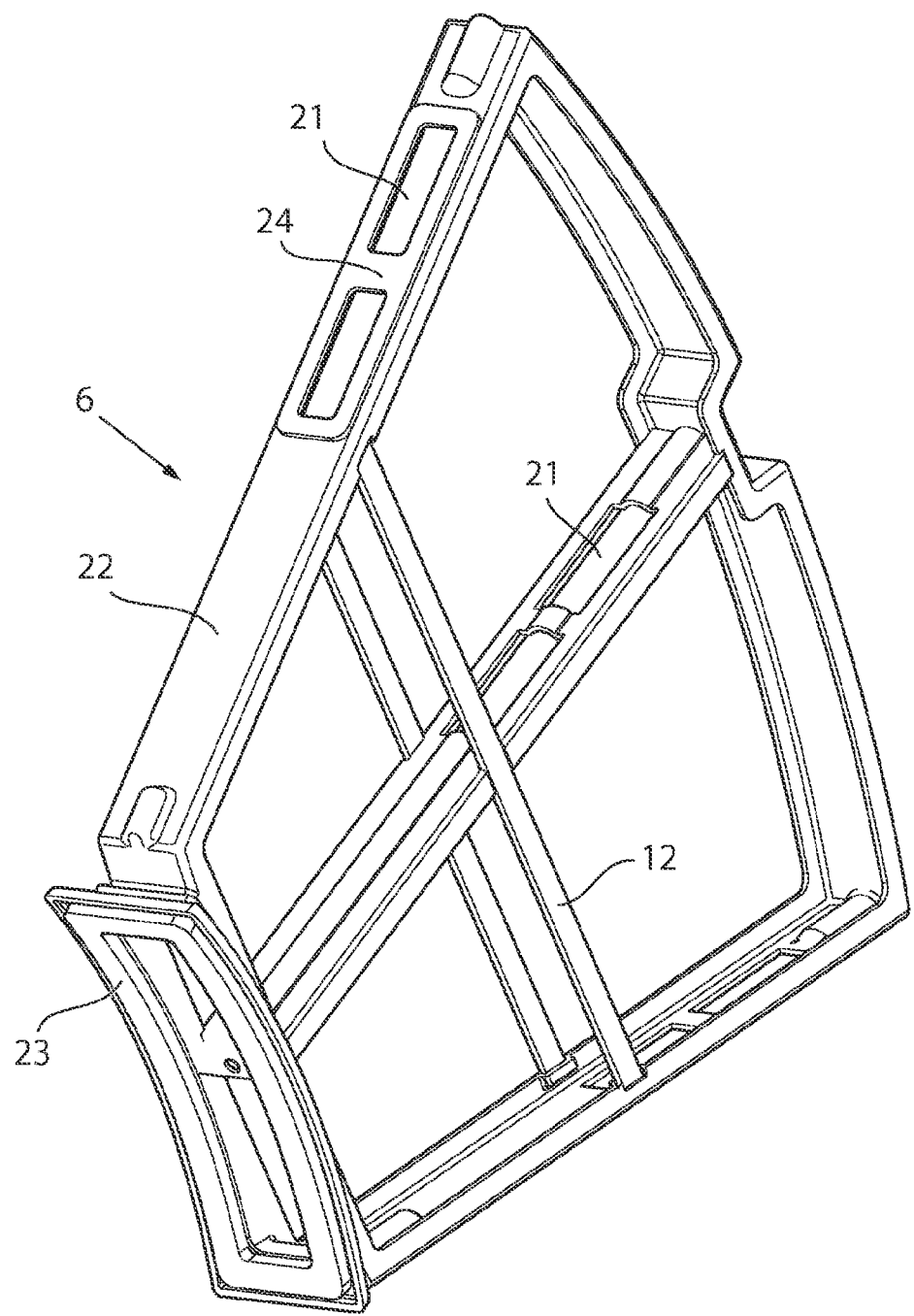

The present invention will now be described in exemplifying embodiments by reference to the attached drawings, in which:

FIG. 1 shows a perspective view of a disc filter according to the invention having filter elements according to the present invention, FIG. 2 shows a framework or structure in an embodiment of a filter element according to the present invention in a perspective view from above, FIG. 3 shows an embodiment of a fastening organ for fastening a filter element in a disc filter, FIG. 4 shows an embodiment of a filter element according to the present invention in a perspective view from above, and FIG. 5 shows seals arranged on a filter element according to the present invention.

DETAILED DESCRIPTION OF PREFERRED EMBODIMENTS OF THE PRESENT INVENTION

FIG. 1 shows a disc filter 1 having a plurality of filter elements 2 arranged on a rotor shaft 3 and forming a filter disc 25. Liquid communication can take place between the inside 4 of the filter elements 2 and the inside 5 of the rotor shaft 3 through at least one cutout or opening 9 in the rotor shaft 3 and at least one cutout or opening 10 in the filter element 2. FIG. 2 shows the filter element 2 comprising a framework 6, which carries filter cloth 7 on both its side surfaces 8, see also FIG. 4. The framework 6 and the filter cloth 7 are permanently joined so that the filter element 2 forms a single use filter element 2.

The framework 6 preferably comprises a frame 11, a cross-bar 12 for each side surface 8 and a central support 13 extending from the outer part 14 of the frame 11, forming a part of the periphery of the filter disc 25 when in use, to a connecting part 15, adjacent to the rotor shaft 3 when in use. The filter element 2 is preferably manufactured in its entirety of one or more polymeric materials. This term should also be considered to include reinforced polymeric materials or similar materials mainly consisting of a polymer. The term also includes filter element that comprise minor parts, such as screws, made of a different material, such as a metal.

FIG. 3 shows a fastening organ 16 comprising a long bolt 17 and a nut 18. The long bolt 17 is threaded in both ends. When the filter element 2 is fastened to the rotor shaft 3, the long bolt 17 is threaded through a hole 19 and along the central support 13. The filter element is kept in the desired place on the rotor shaft 3 and the long bolt 17 is screwed in place in a threaded opening 20 in the rotor shaft 3, and thereafter the bolt 18 is screwed in place in the part of the long bolt 17 protruding through the hole 19. In this fashion the filter element 2 can be fastened to the rotor shaft 3 using only one fastening organ 16.

The framework 6 of the filter element 2 has at least one passage 21 in each edge 22 for liquid communication between the inside 4 of adjacent filter elements 2 in assembled position when the filter elements 2 are arranged edge 22 to edge 22 forming a filter disc 25. Similarly, the central support 13 has at least one passage 21. The inside 4 of the filter element thereby forms one single compartment for fluids.

FIG. 5 shows a first seal 23 arranged between the filter element 2 and the rotor shaft 3 and a second seal 24 arranged around the passage 21 to the adjacent filter element 2 on one edge 22 only.

The width between the side surfaces 8 of filter cloth 7 are between 1.15 and 1.40 times the width of an opening 9 for liquid communication in the rotor shaft 3. Experiments have shown that an opening 9 of 55 mm in the rotor shaft 3 requires a width of at least 65 mm of the filter element 2 according to the invention, whereas the same 55 mm opening requires a width of at least 90 mm in the conventional filter element.

Preferred embodiments of a filter element and a disc filter have been described. It will be appreciated that these can be varied with the scope of the appended claims without departing from the inventive idea.

The invention claimed is:

1. A removable filter element for use in a disc filter, wherein a plurality of removable filter elements are arranged on a rotor shaft in a manner allowing liquid communication between the inside of the filter elements and the inside of the rotor shaft, for the filtering of liquids, wherein each of the removable filter elements comprise:
   a framework, and
   a filter cloth carried on both sides of the framework, wherein the framework and the filter cloth are permanently joined forming a single use filter element, wherein the framework and the filter cloth define an interior, wherein
   the framework comprises:
      at least one opening placing an interior of the framework in fluid communication with an inside of the rotor shaft, and
      at least one passageway in each side edge of the framework placing the interior of the framework in fluid communication with an interior of an adjacent framework when the adjacent framework is assembled edge to edge on the rotor shaft forming the disc filter.

2. The filter element according to claim 1, being manufactured entirely of one or more polymeric material or materials.

3. The filter element according to claim 1, being attachable to the rotor shaft through a single attachment organ.

4. The filter element according to claim 1, having a seal arranged between the filter element and the rotor shaft and a seal arranged around the passage to the adjacent filter element on only one edge thereof.

5. The filter element according to claim 1, wherein the distance between the filter cloths on the side surfaces of the filter element is between 1.15 to 1.40 times the width of an opening for liquid communication in the rotor shaft.

6. The filter element according to claim 1, wherein the filter element is adapted for filtering taking place from the inside of the filter element and out through the filter cloth.

7. The filter element according to claim 1, wherein the inside of the filter element forms one single compartment for fluids.

8. A disc filter comprising a plurality of filter elements according to claim 1 which are assembled edge to edge forming a filter disc.

9. The filter element according to claim 2, being attachable to the rotor shaft through a single attachment organ.

\* \* \* \* \*